Jan. 9, 1934.  G. H. PFEFFERLE  1,942,489
GASKET
Filed Aug. 23, 1932   2 Sheets-Sheet 1

INVENTOR
George H. Pfefferle
BY
Louis Prevost Whitaker
ATTORNEY

Jan. 9, 1934.  G. H. PFEFFERLE  1,942,489
GASKET
Filed Aug. 23, 1932   2 Sheets-Sheet 2

INVENTOR
George H. Pfefferle
BY
ATTORNEY

Patented Jan. 9, 1934

1,942,489

UNITED STATES PATENT OFFICE 1,942,489

GASKET

George H. Pfefferle, Bradford, Pa., assignor to S. R. Dresser Manufacturing Company, Bradford, Pa., a corporation of Pennsylvania Application August 23, 1932. Serial No. 630,013

3 Claims. (Cl. 288—1)

My invention consists in the novel features hereinafter described, reference being had to the accompanying drawings which show several ways in which my invention may be carried out, selected by me for purposes of illustration, and the invention is fully disclosed in the following description and claims.

In the art of pipe couplings, it is customary to employ circular gaskets of vulcanized rubber, or rubber compound, which are preferably molded as integral rings of the desired diameter and cross section for the purpose intended. In many instances, as in the case of repair clamp gaskets for bell and spigot joints, collar clamp gaskets, split sleeve end gaskets, and coupling gaskets, replacing the gaskets in a coupling already installed in a pipe line, for example, it is necessary to place the gasket around a pipe without disturbing its position in the line or interrupting the passage of fluid therethrough, and in such cases an integral or endless gasket cannot be employed. To provide for such uses, it is customary to mold the gaskets integrally and sever them at one point in the circle by a diagonal cut so as to leave an open lapped joint or scarf joint to enable the gasket to be placed around a pipe and the ends lapped. The scarf joint is usually made for the reason that if the ring gasket were severed on a radial plane, to form a "butt" joint, the butted ends would have a greater tendency to separate when the gasket is compressed, than a "scarf" or lapped joint. Owing to the elastic character and other natural characteristics of rubber, it is difficult, if not practically impossible, to secure perfectly plane surfaces on opposite sides of a cut, but the faces on the opposite sides thereof will obviously fit each other, if neither is altered. In many instances, however, it is necessary in applying these gaskets in the field, to cut off a piece from one or other of the ends to accommodate variations in the peripheries of the pipes. This is done by hand with a knife, leaving an end surface which will not accurately fit the other end surface of the gasket, and this difficulty may and frequently does result in leakage, after the joint is tightened up. It is obviously easier to cut off a portion of the gasket in a radial plane so as to produce a smooth or approximately plane end face, but butt joints in gaskets are not practicable for the reason stated.

One of the objects of my invention is to provide for permanently joining the severed end portions of such gaskets in the field whether the ends are cut off for a butt joint or a scarf joint, thus making it possible to form these gaskets with butt joints where they require shortening in the field. I have discovered that if a face of a piece of rubber or rubber compound is provided with a film of uncured rubber, it can be made to adhere permanently, by simply bringing the said film into contact with another surface of rubber or other material. According to my invention I form the gaskets as integral rings, and sever them either diagonally or radially, but preferably radially to form a butt joint, and provide one or both of the faces on opposite sides of the cut with a film of uncured unvulcanized rubber, the said film being provided on its outer surface with a removable impervious protecting covering, such, for example, as a piece of the well known Holland fabric. When the gaskets are placed in position of use in the field, the protecting coverings or strips are removed, the butted or scarfed ends are brought together, and will become instantly and permanently united, so that they cannot be separated by the application of pressure to the gasket. If the gasket requires shortening, a piece is cut off of the end not provided with the uncured rubber film (if only one end is so provided) or from either end, if both ends are so provided, as it is not necessary to provide more than one of the meeting faces with the rubber film. My invention, therefore, permits of the use of butt joints in these gaskets, with the result that a piece can be cut off by a radial incision to form a substantially plane end face, and when pressed into contact with the uncured rubber film on the opposite butt face, the elasticity of the rubber compensates for the slight surface irregularities which may be present, and the entire surfaces of the butted faces become permanently united. It will, however, be understood that my invention is equally applicable to the production of scarf joints.

The gasket can be provided with an uncured rubber film on the appropriate face or faces in a number of ways, one of which consists in a treatment of the said face either during or after the manufacture thereof, with means for preventing the vulcanizing, or otherwise maintaining or treating, a thin surface film, so that it shall be or remain in the uncured and highly adhesive state, and by applying a suitable strip or piece of Holland or other impervious protecting coating thereto.

In practice I have found it very convenient to calender a suitable uncured rubber or gum between two sheets of impervious material, as Holland, to a thickness of from seven to ten thousandths of an inch, the Holland preventing the sheet of uncured rubber or gum from adhering to the calender rolls. This composite sheet is then cut or died into the shape of the surface of the gasket to which the film is to be applied, as one face of a butt or scarf joint. One strip of Holland is then removed and the film of rubber or gum is directly applied to the surface of the gasket, which may conveniently be "freshened" with gasoline or other rubber solvent before the film is applied. The other piece of Holland is left in place to protect the film until the ends of the gasket are ready to be joined in the field.

It will of course be understood that both of the abutting faces may be provided with a piece of this composite sheet from which one protecting covering has been removed, if this is found necessary or desirable. It will also be understood that the composite sheet material comprising a film of uncured gum and protecting coverings on opposite faces, may be sent to the field, either in the form of sheets, strips or pieces, died out to conform with the cross section of the particular gaskets, and the adhesive films applied to the gasket in the field, if desired. It will also be understood that other faces of the gasket, as for example, the inner face or the outer face, or one or both of the end faces, may be provided with a film of uncured gum in any of the manners previously described, and suitably protected by an impervious covering, so that the gasket may, on the removal of the protective covering, be permanently united to the pipe or adjacent coupling member.

My invention also comprises certain novel features of construction and combination of parts hereinafter described and particularly pointed out in the claims.

Referring to the drawings.

Figure 1:
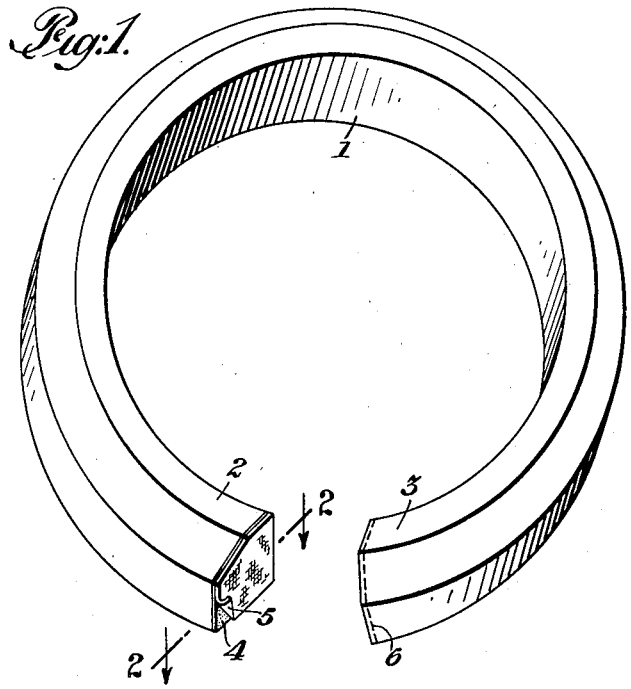
Fig. 1 is a perspective view of a gasket severed to form a butt joint, one end face being provided with an attaching film, and having an impervious removable protecting covering applied thereto.
Figure 2:
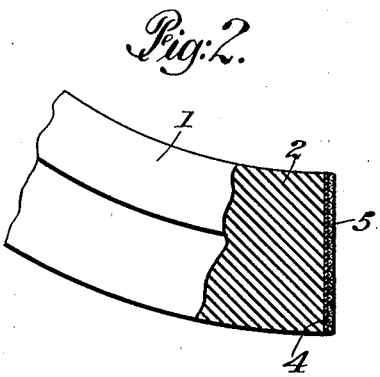
Fig. 2 is a partial horizontal sectional view on line 2—2 of Fig. 1, drawn to an enlarged scale.
Figure 3:
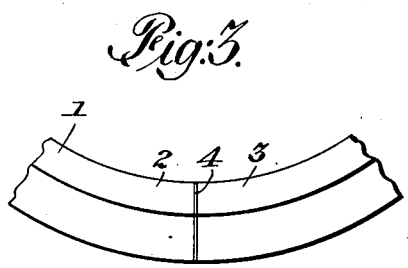
Fig. 3 is a plan view of a portion of the gasket shown in Fig. 1, with the ends united to form a butt joint.

In Figs. 1, 2 and 3, I have shown my invention applied to a rubber gasket, 1, of known form, composed of molded and vulcanized rubber, or rubber compound. The gasket is preferably molded as a complete ring and severed by a radial cut, but it may be molded in the form shown in Fig. 1, if desired. One of the gasket ends, indicated at 2, is provided on its end face with a film or coating or surface, indicated at 4, of uncured gum or rubber, permanently united thereto, and having its outer surface entirely covered with removable impervious sheet or layer 5, of Holland, cellophane, or other suitable material. It is not necessary to provide the opposite end, 3, of the ring with an adhesive film and a removable protective covering therefor, and it is shown without the same. It could be so provided, however, if desired. The gaskets, in the form shown in Fig. 1, may be shipped to the field, and when it is desired to use one, the end, 3, is cut radially, as indicated by the dotted line, 6, for example, to make it exactly the length desired. The protective covering is then pulled off of the face of the adhesive film, 4, and the face of the end, 3, is pressed firmly against the adhesive film, thus permanently uniting the ends, 2 and 3, of the gasket, 1, and making it endless and exactly fitted to the place it is to occupy, in the coupling, or repair device, of which it forms a part. The uncured rubber or gum adhesive film becomes practically vulcanized in a short time, and the gasket so formed and applied is as efficient as a molded ring which has not been severed.

Figure 4:
Fig. 4 is a detail sectional view of a piece of composite sheet comprising the adhesive film, and a removable protecting covering on both faces thereof.
Figure 5:
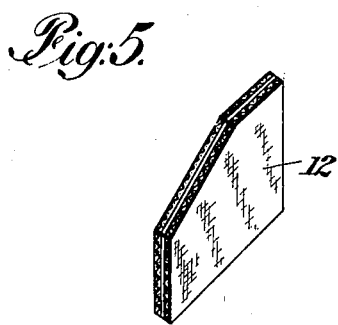
Fig. 5 is a perspective view of a died out portion of such composite sheet adapted for use in connection with the gasket shown in Figs. 1, 2 and 3.

In Fig. 4 I have shown a composite sheet which can be conveniently used in carrying my invention into effect. It comprises two sheets, 9 and 10, of impervious protecting material, as Holland, cellophane, or other suitable material, with an intervening sheet or film, 11, of uncured gum or rubber protected on both surfaces by the sheets, 9 and 10, preferably calendered to any suitable thickness, as seven to ten thousands of an inch. In using this composite material in connection with the gasket shown in Figs. 1, 2 and 3, for example, pieces, 12, thereof, are cut or died out as shown in Fig. 5, of a size corresponding with the face of the gasket to be treated, in this instance corresponding with a cross section of the gasket. One of the protecting coverings is removed from the piece of composite material, and applied to the end, as 2, of the ring, as before described, leaving the other face protected by the remaining covering, which is not removed until the gasket is installed in the field.

While this composite sheet may be found convenient and desirable in carrying out my invention, I wish it understood that I do not limit myself to its use, and one or both of the meeting ends of the gasket can be provided with the adhesive film, in other ways.

Figure 6:
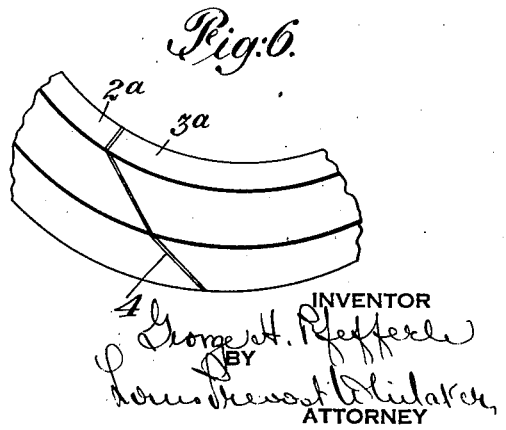
Fig. 6 is a plan view, similar to Fig. 3, showing the gasket provided with a scarf joint.

My invention is of course equally applicable to a scarf joint, and in Fig. 6 I have shown a portion of a gasket, in which the ends, 2a, 3a, are provided with overlapping portions, the opposed faces of which are united by the film of uncured gum or rubber, indicated at 4.

Figure 7:
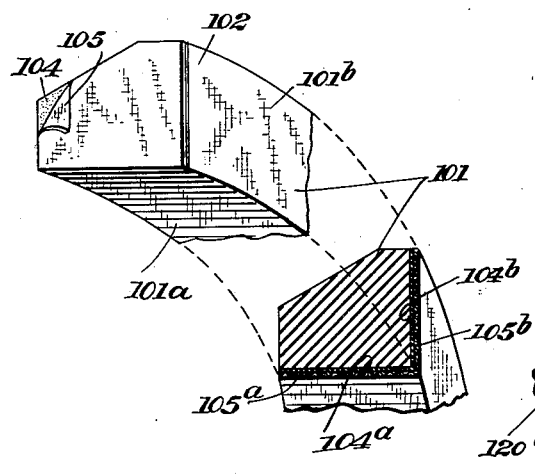
Fig. 7 is a perspective view of a portion of the gasket showing circular faces thereof, provided with an adhesive film and a protecting covering therefor.
Figure 8:
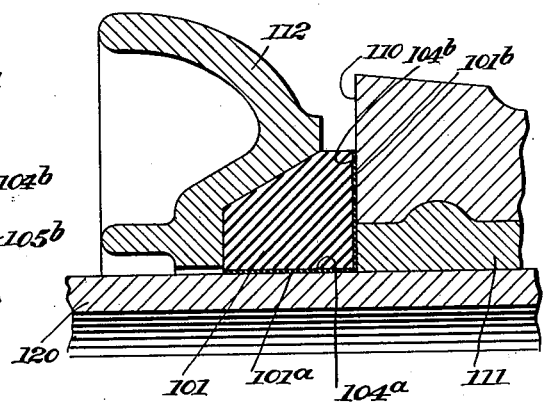
Fig. 8 is a detail sectional view illustrating the gasket shown in Fig. 7, in operative position in connection with a bell and spigot joint.

In Fig. 7 I have illustrated a portion of gasket, indicated at 101, in which the inner or pipe engaging face, 101a, is shown provided with an adhesive film of uncured gum or rubber, indicated at 104a, applied in any of the ways hereinbefore described, and protected by a removable impervious covering, 105a, applied to the outer face thereof. One of the perpendicular faces, as 101b, is likewise shown provided with an adhesive film, indicated at 104b, covered with an impervious protecting strip, 105b. This gasket is particularly adapted for use with bell and spigot pipe joints, as shown in Fig. 8. The end portion, 102, is shown provided with the adhesive film, 104, and the protecting covering, 105, as in Fig. 1. It will be obvious that by removing the protecting coverings, 105, 105a, and 105b, from this ring it can be placed around a pipe, 120, and made endless, in the manner previously described, the inner face, 101a, of the gasket being permanently united to the pipe all the way around by the adhesive film or surface, 104a, and the face, 101b, being adhesively united to the face of a bell, 110, and the solid packing, 111, therein, as shown in Fig. 8, the gasket being engaged by a suitable clamping ring, indicated at 112, having a packing recess to fit the exterior of the gasket.

In like manner, any face of the gasket may be provided with an adhesive film and protected against deterioration, until its use in the field. It will be understood that the particular form or cross section of the gasket has no bearing on the invention, and that the form shown is selected merely by way of example.

Figure 9:
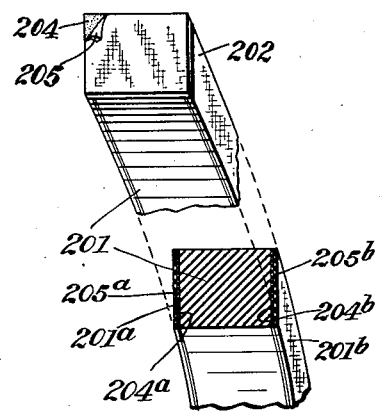
Fig. 9 is a perspective view of a joiner gasket of substantially rectangular section, embodying my invention.

In Fig. 9 I have shown what I term a joiner gasket, 201, preferably substantially rectangular in cross section, one or more of the faces of which may be provided with a surface or film of uncured gum or rubber. This joiner gasket can be used conveniently by attaching it to one of the usual forms of gasket, or by inserting it between two regular gaskets, where such use is advantageous. In Fig. 9, for example, I have shown the parallel substantially perpendicular or end faces, 201a, and 201b, provided with the adhesive uncured films or surfaces, indicated at 204a and 204b, protected by the annular impervious strips, 205a and 205b, and an end, 202, having a radial face provided with the adhesive film, 204, covered by the protecting strip, 205.

Figure 10:
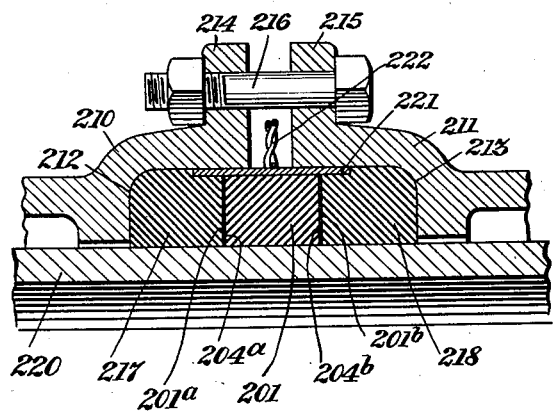
Fig. 10 is a detail sectional view of portions of a repair device showing the joiner gasket of Fig. 9, in operative position.

In Fig. 10 I have shown a portion of a repair clamp comprising sleeve members, 210, 211, having opposed packing recesses, 212 and 213, and bolt engaging flanges, 214 and 215, connected by bolts, one of which is indicated at 216. In this instance I have shown gaskets, 217 and 218, in the recesses, 212 and 213 (the ends of which are not shown) are joined in the manner previously described, and a joiner gasket, 201, from which the protecting strips, 205, 205a and 205b, have been removed. The ends of the joiner strip are united around the pipe, 220, as before described, and the lateral faces, 201a and 201b, are united to the adjacent faces of the gaskets, 217 and 218, so that the several gaskets are made into an integral gasket or packing. 221 represents a flat band of steel which bridges the space between the sleeve members and engages the outer peripheral surfaces of the joiner gasket, and gaskets, 217, 218, and 222, indicates a retaining wire which may be employed to hold the band, 221, temporarily in position.

It will be understood that the particular forms of repair devices shown herein to illustrate my present invention form no part of my present invention, and are not claimed herein.

It will also be understood that where a circular face or faces of the gasket is to be provided with the adhesive film or uncured rubber, this may be conveniently accomplished by cutting pieces or strips of the required shape and area from the composite sheet illustrated in Fig. 4, removing the protecting covering on one side and applying the film to the gasket, in the same manner as previously described, leaving the protecting sheet on the outer face of the film until the gasket is about to be installed. In this manner the gaskets of all the varying forms and cross sections can be manufactured and shipped to the point of use, where the exterior protecting sheets can be removed, the gaskets made endless after being cut to an exact length, if necessary, and installed and adhesively united with parts of the coupling or to another gasket or gaskets, without the use of any extraneous material or tools.

What I claim and desire to secure by Letters Patent is:

1. As an article of manufacture, a rubber gasket of split ring form, a film of adhesive applied to at least one of the abutting ends to secure the ends together and produce a leak-proof joint, and a temporary protective covering for said film.

2. As an article of manufacture, a rubber gasket having faces disposed at an angle to one another and each provided with a film of adhesive and a temporary protective covering for said films, held in position thereon by the adhesiveness of said films, said gasket having meeting ends, one of which is provided on its end face with a film of adhesive for uniting the ends of the gasket when installed, and a temporary protective covering for the film on said end held in position by the adhesiveness of said film.

3. As an article of manufacture, a rubber joiner gasket having its opposite annular faces provided each with an adhesive film, of uncured gum and a removable strip of impervious protecting material applied to the outer face of each of said films, and held in position by the adhesiveness thereof, said gasket having meeting ends, one of which is provided on its end face with an adhesive film of uncured gum for uniting the ends of the gasket when installed, and a removable impervious protecting sheet engaging the outer face of said end face film, and held in position by the adhesiveness thereof.

GEORGE H. PFEFFERLE.